United States Patent
Kanzaka et al.

(10) Patent No.: US 8,342,418 B2
(45) Date of Patent: Jan. 1, 2013

(54) THERMO-VALVE

(75) Inventors: Ryuji Kanzaka, Miyoshi (JP); Tadasu Tomohiro, Toyota (JP); Yoshinori Sato, Toyota (JP)

(73) Assignees: Toyota Jidosha Kabushiki Kaisha, Aichi-ken (JP); Nippon Thermostat Co., Ltd., Tokyo (JP)

( * ) Notice: Subject to any disclaimer, the term of this patent is extended or adjusted under 35 U.S.C. 154(b) by 0 days.

(21) Appl. No.: 13/319,277

(22) PCT Filed: Mar. 11, 2010

(86) PCT No.: PCT/JP2010/001721
§ 371 (c)(1),
(2), (4) Date: Nov. 7, 2011

(87) PCT Pub. No.: WO2010/137214
PCT Pub. Date: Dec. 2, 2010

(65) Prior Publication Data
US 2012/0055565 A1   Mar. 8, 2012

(30) Foreign Application Priority Data

May 29, 2009  (JP) .................................. 2009-130951
Dec. 28, 2009  (JP) .................................. 2009-298185

(51) Int. Cl.
*F16K 35/06* (2006.01)
*G05D 23/02* (2006.01)
*F04B 19/02* (2006.01)
(52) U.S. Cl. ..................... 236/99 K; 236/93 R; 417/468
(58) Field of Classification Search ................ 236/93 R, 236/93 A, 99 R, 99 K; 137/468
See application file for complete search history.

(56) References Cited

U.S. PATENT DOCUMENTS

| | | | |
|---|---|---|---|
| 6,253,837 B1 * | 7/2001 | Seiler et al. ................... | 165/103 |
| 7,665,513 B2 | 2/2010 | Sasaki | |
| 8,191,794 B2 * | 6/2012 | Sasaki et al. ................ | 236/99 K |

FOREIGN PATENT DOCUMENTS

| | | |
|---|---|---|
| DE | 3108419 A1 | 9/1982 |
| EP | 0273358 A2 | 7/1988 |
| JP | 05-42868 U | 6/1993 |
| JP | 06-12707 U | 2/1994 |
| JP | 11-201265 A | 7/1999 |
| JP | 2001-517754 A | 10/2001 |

(Continued)

*Primary Examiner* — Chen Wen Jiang
(74) *Attorney, Agent, or Firm* — Sughrue Mion, PLLC

(57) ABSTRACT

The present invention is to provide a thermo-valve which can be operated with no unnecessary work to fill fluid easily and without fail into a circuit having the fluid flow therethrough at the time of a high temperature range. The thermo-valve comprises a valve housing 21, and a center guide shaft 27 movable to assume a valve movement limitation position GP1 in which a valve member 31 is retained to a second operation position BP2 to open a specific port, and a valve movement allowance position in which the valve member 31 is allowed to displace, the center guide shaft 27 and the valve housing 21 allowing a bimetal ring 51 to be disposed therebetween, and the bimetal ring being deformed to retain the center guide shaft 27 to the valve movement limitation position GP1 at the initial stage until the temperature of oil in the valve housing 21 firstly reaches the high temperature range, and to release the center guide shaft 27 from the valve movement limitation position GP1 when the temperature of the oil in the valve housing 21 reaches the high temperature range.

13 Claims, 8 Drawing Sheets

FOREIGN PATENT DOCUMENTS

| | | |
|---|---|---|
| JP | 2006-064155 A | 3/2006 |
| JP | 2007-211715 A | 8/2007 |
| JP | 2007-333068 A | 12/2007 |
| JP | 2009-008273 A | 1/2009 |
| WO | 99/15767 A1 | 4/1999 |
| WO | 20070144746 A2 | 12/2007 |
| WO | 2009/012311 A2 | 1/2009 |

* cited by examiner (a)

(b)

(c)

THERMO-VALVE

CROSS REFERENCE TO RELATED APPLICATION

This application is a National Stage of International Application No. PCT/JP2010/001721 filed Mar. 11, 2010, claiming priority based on Japanese Patent Application No. 2009-130951, filed May 29, 2009, and Japanese Patent Application No. 2009-298185, filed Dec. 28, 2009, the contents of all of which are incorporated herein by reference in their entirety.

TECHNICAL FIELD

The present invention relates to a thermo-valve and in particular to a thermo-valve suitable for an oil circuit having a heat exchanger for exchanging heat and adjusting the temperature of oil to be used for lubricating and cooling a vehicular transmission.

BACKGROUND ART

In general, the vehicular transmission is assembled in an automatic transmission system which is of a step-variable transmission type or of a continuously variable transmission type. The automatic transmission system comprises an oil cooler having oil pass therethrough to lubricate and cool the transmission. For selectively passing the oil through the oil cooler, a thermo-valve is used to change oil passageways in response to the temperature of the oil.

As one of the thermo-valves of this kind, there has so far been known a thermo-valve of a wax accommodating type to selectively open and close the oil passageways held in communication with first and second heat exchangers. The first heat exchanger functions to exchange the heat of the oil for lubricating and cooling the transmission with the heat of cooling water for cooling an engine after the cooling water has passed through a heater core. The second heat exchanger is an oil cooler of an air-cooling type and disposed between the automatic transmission and the first heat exchanger to exchange the heat of the oil returning to the automatic transmission from the first heat exchanger with the heat of air introduced from the front of an automotive vehicle, so that the second heat exchanger can cool the oil returning to the automatic transmission from the first heat exchanger with by opening the oil passageway to the second heat exchanger with the thermo-valve when the temperature of the oil becomes higher than the preliminarily set temperature.

The thermo-valve of the wax accommodating type comprises a valve for opening and closing a bifurcated oil passageway allowing the oil to be introduced into the second heat exchanger, a valve supporting member in a bottomed cylindrical shape for supporting the valve, and a supporting shaft in a piston shape for movably supporting the valve supporting member. The valve supporting member has wax accommodated therein with the wax being expandable and contractible in response to the temperature of the wax. The thermo-valve further comprises a compression spring for resiliently urging the valve so that the valve can be opened and closed by means of the temperature sensitive wax and the compression spring. There has so far been encountered such a problem that the oil is difficult to be filled into the oil circuit of the second heat exchanger, which can be opened for the oil maintained at a high temperature, in the state in which the oil in the oil circuit is maintained at a low temperature at the stage of manufacturing vehicles. In order to overcome such a problem, there has so far been proposed one of the thermo-valves which comprises an engagement pin in addition to the valve, the supporting member, the supporting shaft, and the compression spring constructed in the previously mentioned thermo-valve. The engagement pin is designed to secure the supporting shaft to a valve housing or case in a forced opened state in which the valve supporting member is moved to have the valve opened against the compression spring. After the oil is filled into the oil circuit of the second heat exchanger, the engagement pin is removed from the supporting shaft and the valve housing before the supporting shaft and the valve supporting member are returned to their respective original positions (see for example Patent Literature 1).

CITATION LIST

Patent Literature

PTL 1: Japanese Patent Laid-Open Publication 2007-333068

SUMMARY OF INVENTION

Technical Problems

The conventional thermo-valve previously mentioned, however, encounters such a problem that the conventional thermo-valve requires a removing operation to remove the engagement pin from the supporting shaft and the valve housing in order to release the supporting shaft from the valve housing after the oil is filled into the oil circuit of the second heat exchanger. The removing operation to remove the engagement pin is laborious and time consuming, and thus becomes an unnecessary work.

Further, in order to make it easy to perform the removing operation for removing the engagement pin, it is necessary to project a handling portion forming of the engagement pin extremely outwardly of the valve housing.

The present invention has been made for solving the problems encountered by the conventional thermo-valve. It is therefore an object of the present invention to provide a thermo-valve which can make unnecessary the removing operation to remove the engagement pin from the supporting shaft and the valve housing and which can realize an oil filling operation to have oil to be filled easily and without fail into the oil circuit of the second heat exchanger which can be opened for the oil maintained at a high temperature.

Solution to Problems

The thermo-valve according to the present invention comprises a valve housing formed with a plurality of ports respectively held in communication with the exterior passageways, and an valve actuation chamber held in communication with the ports; a valve member displaceable in the valve actuation chamber in response to the temperature of fluid in the valve actuation chamber to assume a first operation position to close a specific port selected from among the ports when the temperature of the fluid in the valve actuation chamber is maintained within a predetermined low temperature range, and a second operation position to open the specific port when the temperature of the fluid in the valve actuation chamber is maintained within a predetermined high temperature range, the valve member receiving an urging force toward the first operation position in the valve actuation chamber; and a valve position limitation member accommodated in the valve housing and movable to assume a valve movement limitation position in which the valve member is retained to the second operation position and a valve movement allowance position in which the valve member is allowed to displace in response to the temperature of the fluid, the valve position limitation member being urged toward the valve movement allowance position; characterized in that the thermo-valve further comprises: a temperature sensitive deformation member disposed between the valve position limitation member and the valve housing and deformable in response to the temperature, the temperature sensitive deformation member being deformed into a shape to retain the valve position limitation member to the valve movement limitation position at an initial stage until the temperature of the fluid in the valve housing initially reaches the high temperature range and to release the valve position limitation member from the valve movement limitation position when the temperature of the fluid in the valve housing initially reaches the high temperature range.

By the construction of the thermo-valve previously mentioned, the thermo-valve has the valve position limitation member retained to the valve movement limitation position with the temperature sensitive deformation valve at the initial stage until the fluid is introduced into the valve actuation chamber so that the valve member is retained to the second operation position having the specific port opened. This means that the specific port can be opened irrespectively of the temperature of the fluid in the valve actuation chamber. Therefore, the fluid can be filled easily and without fail into the circuit having the fluid flow therethrough at the time of the high temperature range under the low temperature working environment. The temperature sensitive deformation member can be released from the valve position limitation member to have the valve movement limitation member released from the valve movement limitation position and to have the valve member returned to the valve closing position, while the valve position limitation member returned to the valve movement allowance position when the temperature of the fluid in the valve actuation chamber reaches the high temperature range after the oil is filled into the circuit. At this time, the valve movement limitation member released from the valve movement limitation position in response to the varied temperature of the fluid in the valve actuation chamber makes it possible for the thermo-valve to be operated with no unnecessary work for releasing the valve movement limitation member from the valve movement limitation position. Moreover, the thermo-valve does not need any operation member for operating the valve movement limitation member to be released from the valve movement limitation position to project to the outside of the valve housing.

In the thermo-valve having the above construction (1), (2) the temperature sensitive deformation member may preferably be accommodated in the valve housing and deformable in response to the temperature within the valve housing. By this construction, the temperature sensitive deformation member can be responsive at a high sensitivity to the varied temperature of the fluid in the valve actuation chamber.

In the thermo-valve having the above construction (1), (3) the temperature sensitive deformation member may be provided outside of the valve housing and deformable in response to the temperature of at least one of the valve housing and the valve position limitation member. By this construction, at least one of the valve housing and the valve position limitation member held in contact with the fluid in the valve actuation chamber is varied in temperature in response to the temperature of the fluid to have the temperature sensitive deformation member deformed in response to the temperature of the fluid through the heat conducted between the fluid in the valve actuation chamber and the one of the valve housing and the valve position limitation member. The deformation of the temperature sensitive deformation member can be watched from the outside of the valve housing, thereby making it possible to visually determine whether or not the temperature sensitive deformation member is held in the retained state having the valve position limitation member retained to the valve movement limitation position.

In the thermo-valve having the above construction (1) to (3), (4) the valve position limitation member may preferably be constituted by a movable shaft axially movably supported on the valve housing. By this construction, the temperature sensitive deformation member can be simple in construction due to the temperature sensitive deformation member fixed to or engaged with the part of the valve position limitation member, and the end face of the valve position limitation member.

In the thermo-valve having the above construction (4), (5) the temperature sensitive deformation member may be radially deformed from its initial posture at which the temperature sensitive deformation member is engaged with the movable shaft to have the movable shaft retained to the valve movement limitation position when the temperature sensitive deformation member is deformed to have the movable shaft released from the valve movement limitation position. By this construction, the thermo-valve can be simple in construction due to the temperature sensitive deformation member fixed to or engaged with the part of the movable shaft, and the end face of the movable shaft so that the movable shaft can be retained without fail to the valve movement limitation position and released without fail from the valve movement limitation position.

In the thermo-valve having the above construction (5), (6) the temperature sensitive deformation member may preferably be constituted by a bimetal ring surrounding part of the movable shaft and expandable in diameter to be spaced apart from the part of the movable shaft when the temperature of the fluid reaches the high temperature range. By this construction, the temperature sensitive deformation constituted by a bimetal ring can be expanded in response to the temperature of the fluid in the valve actuation chamber, and can be simple in construction only with the temperature sensitive deformation member fixed to or engaged with the part of the movable shaft so that the movable shaft can be retained without fail to the valve movement limitation position until the temperature of the fluid reaches the high temperature range. The temperature sensitive deformation member constituted by a bimetal ring can be released without fail from the valve movement limitation position when the temperature of the fluid reaches the high temperature range. The temperature sensitive deformation member is not constituted by a bimetal ring, but may be made of a shape memory alloy. The metal ring 51 may be of any shape other than the ring-shape such as an arc shape, a rod shape, a plate shape, and a non-circular annular shape, which can be partly moved toward and away from the movable in response to the ambient temperature varied.

In the thermo-valve having the above construction (5), (7) the temperature sensitive deformation member may have a fixing portion secured to the valve housing, and a deformation portion connected to the fixing portion and deformable to the shape having the movable shaft released from the valve movement limitation position. By this construction, the heat can effectively be conducted from the valve housing to the temperature sensitive deformation member, thereby making it possible to obtain the reliable operation of the temperature sensitive deformation member.

In the thermo-valve having the above construction (5), (8) the deformation portion of the temperature sensitive deformation member may be constituted by a bimetal ring extending in the radial direction of the movable shaft from the fixing portion. By this construction, the temperature sensitive deformation member 61 can be deformed to a large extent in the radial direction of the center guide shaft 27, and can easily be arranged in contact with the end face of the movable shaft.

In the thermo-valve having the above construction (1) to (8), (9) the plurality of ports excludes the specific port, and comprises a first inlet port for introducing the fluid into the inside of the valve housing, a first outlet port for discharging the fluid from the inside of the valve housing, a second outlet port held in communication with the first inlet port, and a second inlet port for introducing the fluid discharged from the second outlet port, a first fluid passageway being formed in the valve housing to have the first inlet port and the first outlet port held in communication with each other when the valve member assumes the first operation position, and a second fluid passageway being formed in the valve housing to have the second inlet port and the first outlet port held in communication with each other through the specific port when the valve member assumes the second operation position.

By this construction, the first fluid passageway and the second fluid passageway can selectively be changed without fail in response to the temperature of the fluid in the valve actuation chamber.

In the thermo-valve having the above construction (9), (10) the plurality of ports includes a communication port constituting part of the first fluid passageway, and the valve member has a first valve body portion for opening and closing the communication port and a second valve body portion for opening and closing the specific port, the first valve body portion assuming the first operation position in which the communication port is opened to have the first inlet port and the first outlet port held in communication with each other through the first fluid passageway, and the second operation position in which the communication port is closed to have the first inlet port and the first outlet port held out of communication with each other through the first fluid passageway, and the second valve body portion assuming the first operation position in which the specific port is closed to have the second inlet port and the first outlet port held out communication with each other, and the second operation position in which the specific port is opened to have the second inlet port and the first outlet port held in communication with each other.

By this construction, the first valve body portion can assume the first operation position in which the communication port is opened to have the first inlet port and the first outlet port held in communication with each other through the first fluid passageway, and the second operation position in which the communication port is closed to have the first inlet port and the first outlet port held out of communication with each other through the first fluid passageway. The first fluid passageway and the second fluid passageway can selectively be changed without fail in response to the temperature of the fluid in the valve actuation chamber with the thermo-valve simple in construction to be moved straightly.

In the thermo-valve having the above construction (10), (11) the valve member may preferably have a slidable cylindrical portion axially slidably engaged with the valve position limitation member, a drum portion integrally formed with the slidable cylindrical portion to form a volume variable chamber closed by the valve position limitation member, the first valve body portion axially displaceably supported on the drum portion, and the first valve body portion and the valve member allowing a first resilient member to intervene therebetween to impart to the first valve body an urging force in the direction having the communication port closed.

By this construction, the closed condition of the communication port can satisfactorily maintained by the first valve body portion even if the volume of the inner chamber of the drum portion in the state in which the valve position limitation member is retained to the valve position limitation position. The inner chamber of the varied volume is preferably filled with the wax expandable and retractable in response to the temperature of the fluid in the valve actuation chamber. In this case, the wax is expanded while being melted to have the valve member displace the drum portion with respect to the movable shaft when the temperature of the fluid in the valve actuation chamber is increased, so that the specific port can be opened by the valve member. Therefore, the increased temperature of the fluid in the valve actuation chamber to open the specific port causes the fluid held at the high temperature can not only be used for adjusting the temperature of the fluid, but also be introduced into other circuits for example such as a cooling circuit.

In the thermo-valve having the above construction (10) and (11), (12) the second valve body portion and the valve housing may preferably allow a second resilient member to intervene therebetween to impart to the second valve body an urging force in the direction having the specific port closed.

By this construction, the valve movement limitation member receiving the urging force from the second resilient member through the valve member can immediately be returned to the valve movement allowance position when the temperature sensitive deformation member is released from the valve position limitation member.

In the thermo-valve having the above construction (1) to (12), (13) the temperature sensitive deformation member may preferably be retained at a specific position of either one of the valve position limitation member and the valve housing when the temperature sensitive deformation member is deformed between the valve position limitation member and the valve housing to the shape having the valve position limitation member released from the valve movement limitation position in response to the temperature of the fluid first reaching the high temperature range.

By this construction, the temperature sensitive deformation member can be positioned without fail at the specific position of the valve position limitation member or the valve housing when the temperature sensitive deformation member is deformed between the valve position limitation member and the valve housing to the shape having the valve position limitation member released from the valve movement limitation position in response to the temperature of the fluid first reaching the high temperature range, so that the releasing operation of the valve position limitation member can be carried out without fail.

Advantageous Effects of Invention

According to the present invention, the thermo-valve is constructed to have the valve position limitation member retained to the valve movement limitation position to open the specific port irrespectively of the temperature of the fluid in the valve actuation chamber with the temperature sensitive deformation valve at the initial stage having the fluid introduced into the valve actuation chamber so that the fluid can be filled without fail into the circuit having the fluid flow therethrough at the time of the high temperature range under the low temperature working environment, and the temperature sensitive deformation member can be released from the valve position limitation member to have the valve movement limitation member released from the valve movement limitation position and to have the valve member returned to the valve closing position without any special releasing operation when the temperature of the fluid in the valve actuation chamber after the oil is filled into the circuit, leads to the fact that the thermo-valve can be operated with no unnecessary work to fill the fluid easily and without fail into the circuit having the fluid flow therethrough at the time of the high temperature range. The present invention is useful for all of the thermo-valves suitable for the circuit having the heat exchanger capable of adjusting the temperature of the oil used for lubricating and cooling the vehicular transmission.

DESCRIPTION OF EMBODIMENTS

Figure 1:
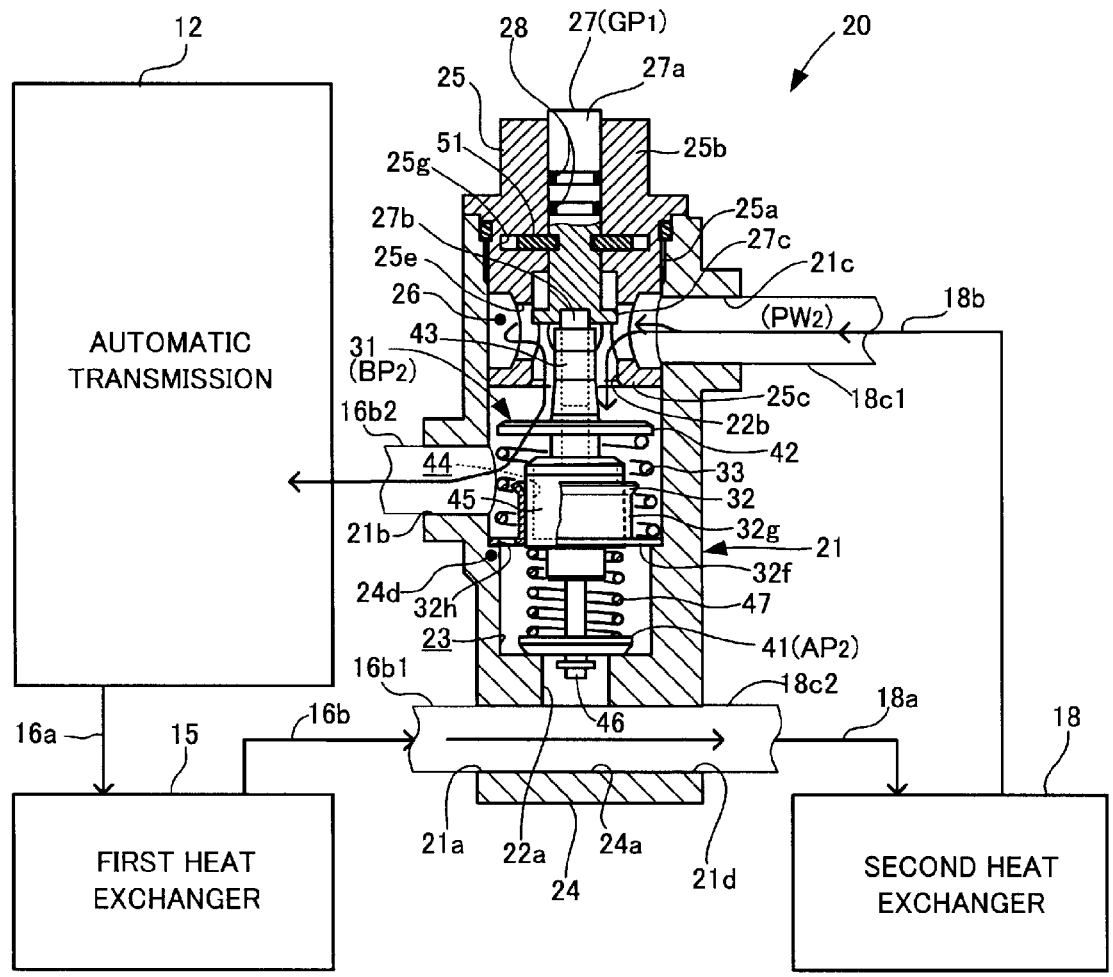
FIG. 1 is a block construction view of an essential part of a vehicle drive system maintained at the initial stage and equipped with a thermo-valve according to one embodiment of the present invention, only the thermo-valve being shown in cross-section.

The preferable embodiments will hereinafter be described with reference to the drawings.

One Embodiment

FIGS. 1 to 5 show a thermo-valve according to one embodiment of the present invention and a vehicle drive system assembled with the thermo-valve. The thermo-valve according to one embodiment of the present invention serves to heat exchanger with the exterior an oil (fluid: for example ATF (Automatic Transmission Field)) flowing in a part of an oil-hydraulic circuit forming part of an automatic transmission for an automotive vehicle to adjust the temperature of the oil within the temperature range preliminarily set.

The construction of the thermo-valve will firstly be explained.

As shown in FIGS. 1 to 3 and FIG. 5, the vehicle drive system 10 in the present embodiment comprises an engine 11 (see FIG. 5) constituting an internal combustion engine, and an automatic transmission 12 constituting a driving force transmission apparatus capable of changing speeds when transmitting the driving force of the engine 11 to driving wheels (driving force output sides) not shown. The automatic transmission herein raised may be of a step-variable transmission type or of a continuously variable transmission type, and may of course include a type of hybrid construction assembled with an electric motor. The thermo-valve according to the present invention can be applied to a transmission other than the automatic transmission 12, i.e., a manual transmission, or can be applied to an oil cooling circuit forming part of another apparatus using oil for lubricating and cooling the elements and parts of the apparatus.

The vehicle drive system 10 is mounted on an automotive vehicle that comprises a radiator 13 and a heater core 14. The radiator 13 is adapted to cool cooling water for the engine 11 with air introduced from the front side of the vehicle. The heater core 14 is designed to heat exchanger the cooling water of the engine 11 with the air introduced into a cabin space in the vehicle to enable the cabin space to become heated. The automotive vehicle further comprises a first heat exchanger 15, a fixing member 17, and a second heat exchanger 18. The first heat exchanger 15 is provided on pipes (see H3 to H5 in FIG. 5) for returning the cooling water to the engine 11 after passing through the heater core 14 to exchange the heat of the cooling water passing through the heater core 14 with that of the oil (fluid) for lubricating and cooling the automatic transmission 12. The fixing member 17 is formed with oil passageways 16a, 16b for communicating the automatic transmission 12 with the first heat exchanger 15, and is constructed to secure the first heat exchanger 15 with a case (not shown in detail) forming part of the automatic transmission 12. The second heat exchanger 18 serves as an oil cooler adapted to cool the oil returning to the automatic transmission 12 from the first heat exchanger 15 with the air introduced from the front side of the vehicle.

Figure 5:
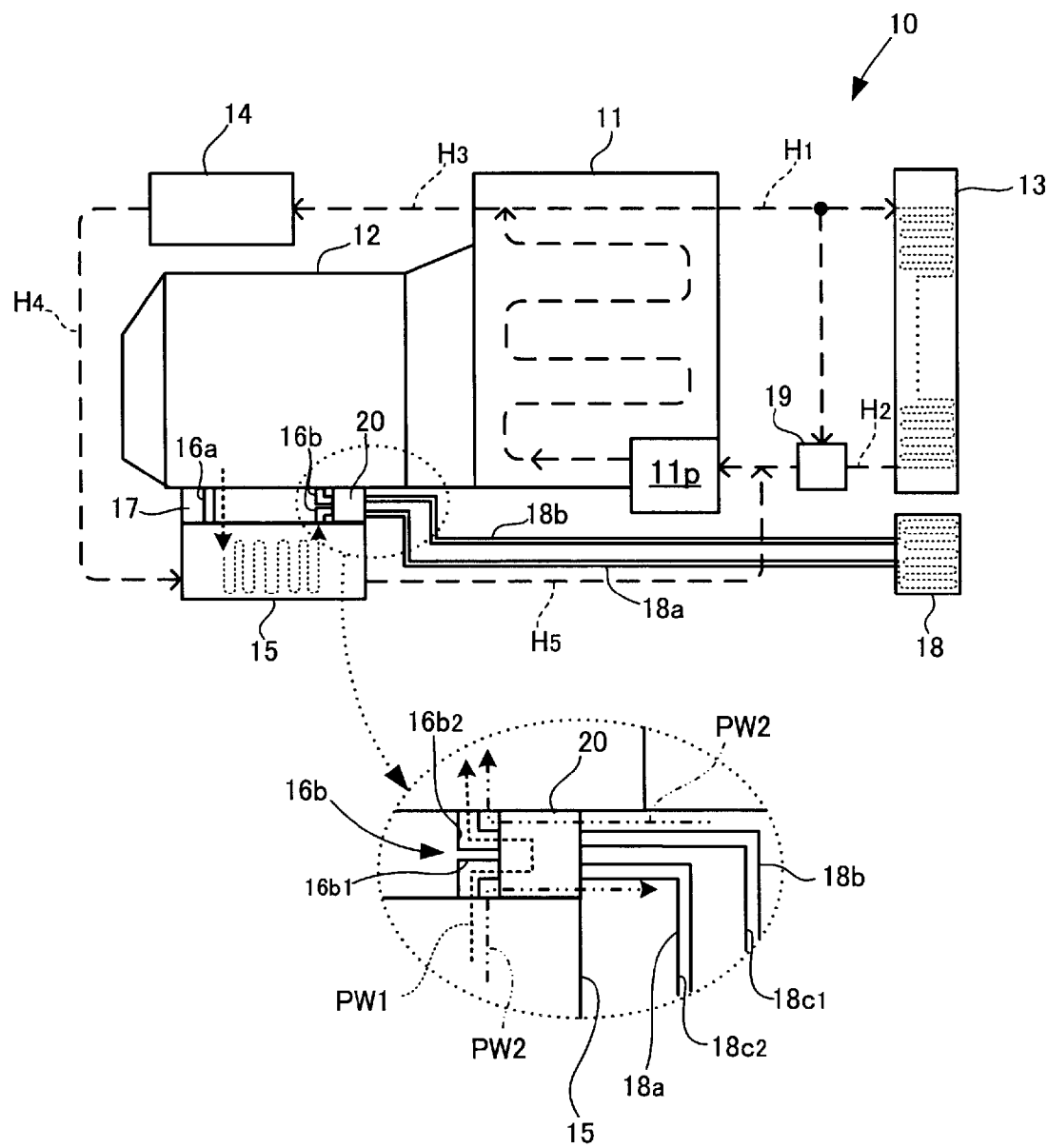
FIG. 5 is a schematic construction view of the vehicle drive system according to one embodiment of the present invention.

The engine 11 is shown in FIG. 5 as having a water pump 11p accommodated therein. The water pump 11p functions to introduce the cooling water at a high temperature into the radiator 13 from the engine 11 through the upper horse H1 while returning the cooling water heat exchanger and thus cooled by the radiator 13 to the engine 11 through the lower horse H2. The water pump 11p further functions to circulate the cooling water from the engine 11 through the heater core 14, i.e., a heat exchanger for heating the cabin space and through the first heat exchanger 15 by way of the pipes H3, H4 and H5. The water pump 11p has an inlet side at which is disposed a thermostat 19 designed to allow the cooling water to be introduced into the lower horse H2 from the upper horse H1 bypassing the radiator 13 at the time of the temperature of the cooling water being below the preliminarily set temperature level while adjusting the amount of the cooling water to pass through the radiator 13 in response to the temperature of the cooling water at the time of the temperature of the cooling water reaching the preliminarily set temperature level. The water pump 11p is of a mechanical type pump driven by the driving force of the engine 11, and may be provided with an electric pump serving to circulate the cooling water (cooling water kept for example over a temperature level to heat the cabin space) while the engine 11 is at a stop if the automatic transmission 12 is for example of a hybrid construction.

Between the automatic transmission 12 and the first heat exchanger 15 are provided a pair of oil pipes 18a, 18b and a thermo-valve 20, i.e., a adjustment valve to adjust the temperature of the oil to enable the second heat exchanger 18 to selectively intervene on the oil passageway 16b adapted to return the cooling water to the automatic transmission 12 from the first heat exchanger 15.

Figure 2:
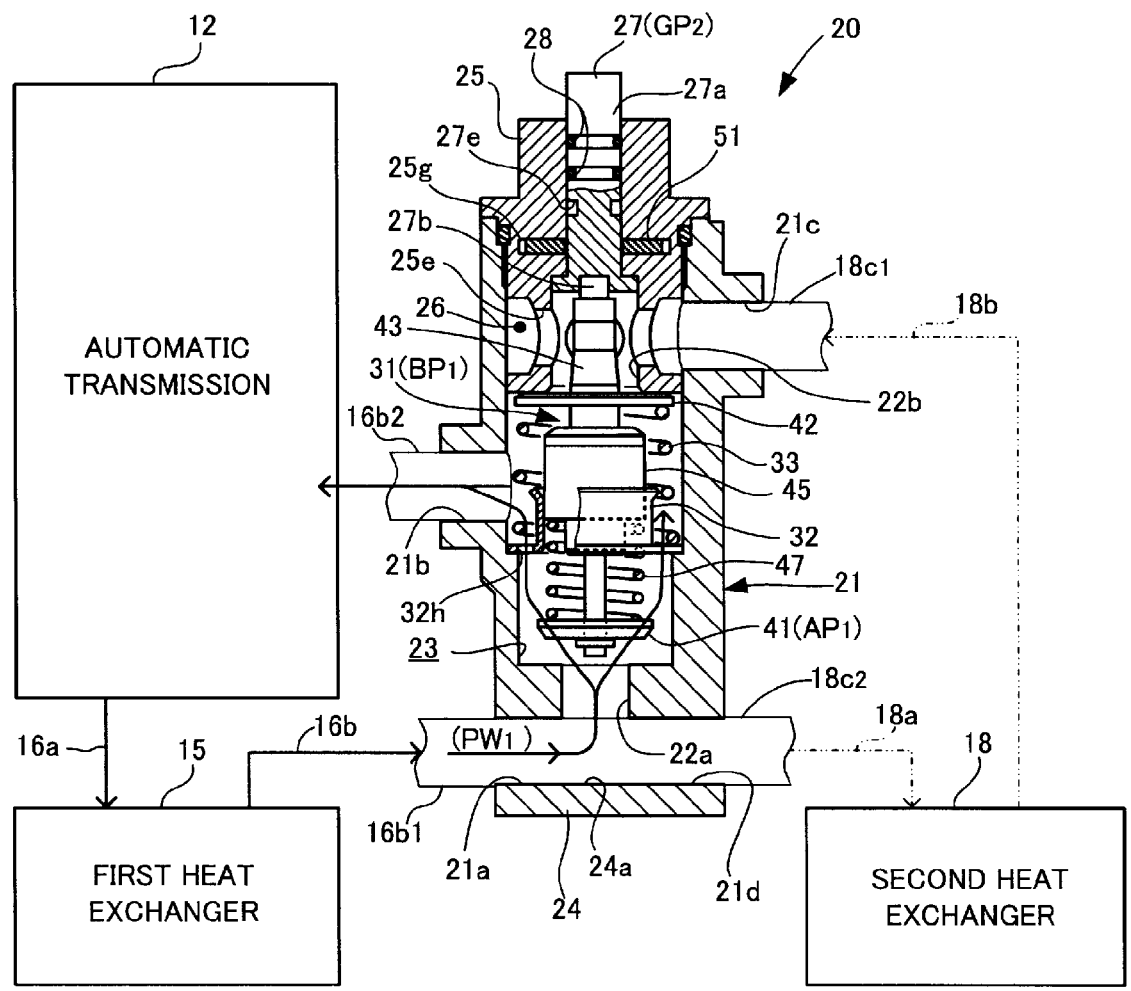
FIG. 2 is a block construction view of the essential part of the vehicle drive system maintained at the time when oil is at a low temperature after the initial stage and equipped with the thermo-valve according to one embodiment of the present invention, only the thermo-valve being shown in cross-section.
Figure 3:
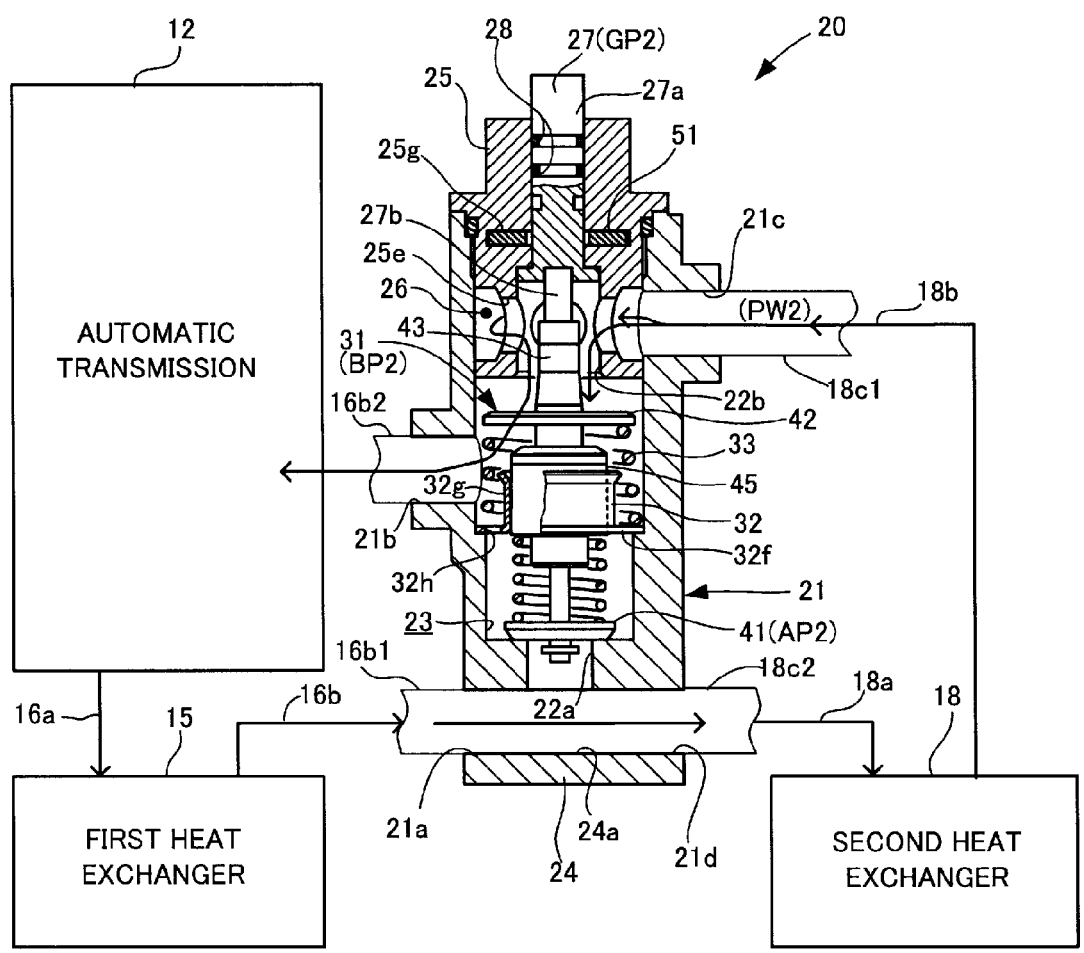
FIG. 3 is a block construction view of the essential part of the vehicle drive system maintained at the time when oil is at a high temperature after the initial stage and equipped with the thermo-valve according to one embodiment of the present invention, only the thermo-valve being shown in cross-section.
Figure 4:
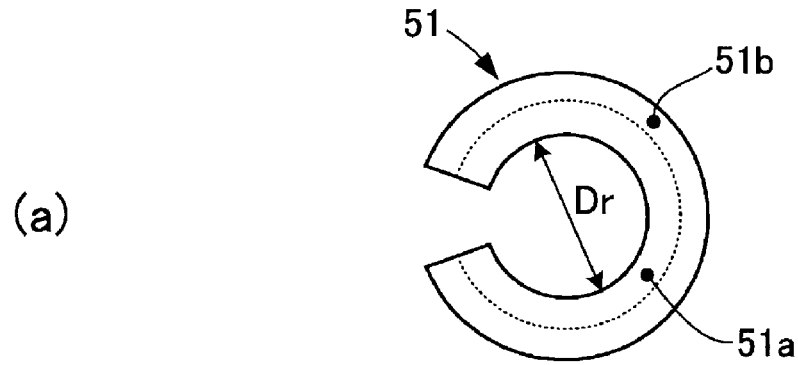
FIG. 4(a) is a plan view of a bimetal ring forming part of the thermo-valve according to one embodiment of the present invention.
FIG. 4(b) is a cross-section view of a valve position limitation member assembled with the bimetal ring at the initial state.
FIG. 4(c) is a cross-section view of a valve position limitation member assembled with the bimetal ring maintained after the oil temperature is raised and reaches a high temperature range.
Figure 4:
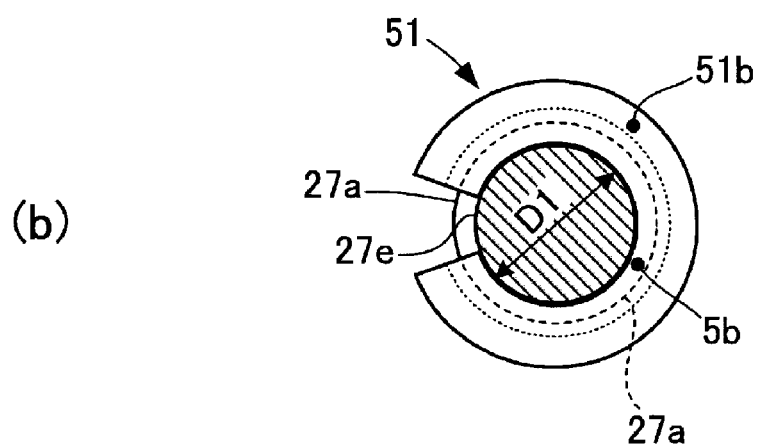
Figure 4:
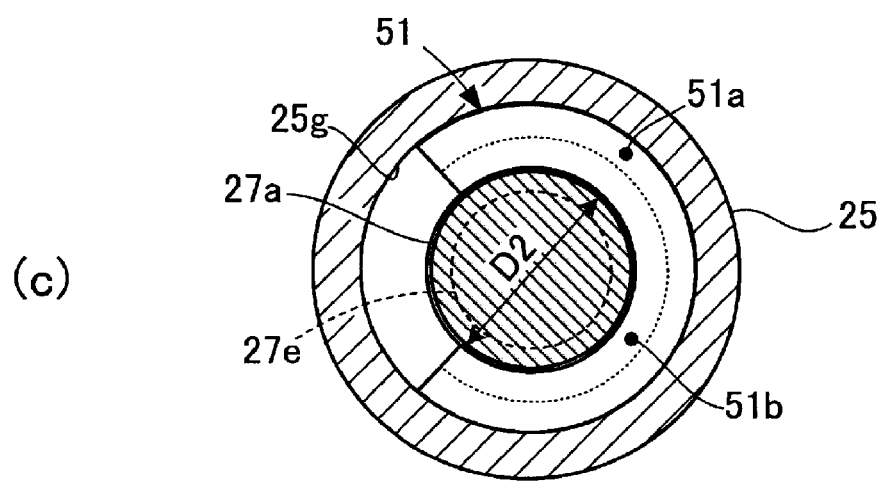

As shown in FIGS. 2 and 3, the thermo-valve 20 is accommodated in and retained by the fixing member 17 to selectively form either one, any one of a first flow passageway PW1 or a second flow passageway PW2 on the oil passageway 16b in response to the temperature of the oil passing through the oil passageway 16b. The thermo-valve 20 is connected with the second heat exchanger 18 through oil pipes 18a and 18b having respective inner portions formed with an oil introduction passageway portion 18c1 and an oil discharge passageway portion 18c2 combined to form part of the second flow passageway PW2. The thermo-valve 20 is not necessarily accommodated in the fixing member 17 if the thermo-valve 20 is positioned on the return side to the automatic transmission 12 from the first heat exchanger 15, but may be positioned on the oil pipes 18a and 18b closer to the second heat exchanger 18 than the position shown in FIG. 5.

When the temperature of the oil introduced into and passing through the oil passageway 16b from the first heat exchanger 15 is in a low temperature range preliminarily set, the thermo-valve 20 has a first flow passageway PW1 formed therein as shown in FIG. 2 so that the oil passageway 16b is constituted by an oil introduction passageway portion 16b1 introducing the oil to the thermo-valve 20 from the first heat exchanger 15, an oil discharge passageway portion 16b2 discharging the oil to the automatic transmission 12 from the thermo-valve 20, and the first flow passageway PW1 selectively formed in the thermo-valve 20.

When, on the other hand, the temperature of the oil introduced into and passing through the oil passageway 16b from the first heat exchanger 15 is in a high temperature range preliminarily set to include a temperature level higher than the upper limit temperature of the low temperature range, the thermo-valve 20 has a second flow passageway PW2 formed as shown in FIG. 3 so that the oil passageway 16b is constituted by an oil introduction passageway portion 16b1 introducing the oil to the thermo-valve 20 from the first heat exchanger 15, an oil discharge passageway portion 16b2 discharging the oil to the automatic transmission 12 from the thermo-valve 20, and the second flow passageway PW2 formed in oil pipes 18a, 18b and the thermo-valve 20. The low and high temperature ranges herein raised are set to cover the most appropriate temperatures determined depending upon the vehicle, and thus may include the same temperature levels partly overlapped. The lower limit temperature of the high temperature range may be higher than the upper limit temperature of the low temperature range to have the temperatures prevented from being overlapped with each other.

The thermo-valve is shown in FIGS. 1 to 3 to comprise a valve housing 21. The valve housing 21 is formed with a plurality of outer connection ports 21a, 21b, 21c, 21d, a pair of valve ports 22a, 22b, and a valve actuation chamber 23, roughly in a cylindrical shape, held in communication with the outer connection ports 21a, 21b, 21c, 21d, and the ports 22a, 22b. The outer connection ports 21a, 21b, 21c, 21d, and the valve ports 22a, 22b constitute as a whole a plurality of ports defined in the present invention. Here, the outer connection ports 21a, 21b, 21c, 21d respectively serves as a first inlet port, a first outlet port, a second inlet port, and a second outlet port, respectively, and are connected with the corresponding exterior passageways defined as the oil introduction passageway portion 16b1, the oil discharge passageway portion 16b2, the oil introduction passageway portion 18c1, the oil discharge passageway portion 18c2.

The valve housing 21 comprises a first housing member 24 in a concavity shape and having one end (see the upper side in FIGS. 1 to 3) open to the outside, and a second housing member 25 in a plug shape and screwed to the first housing member 24 to hermetically seal the one end portion of the first housing member 24. The first housing member 24 is formed with a communication passageway 24a held in communication with the oil introduction passageway portion 16b1 and the oil discharge passageway portion 18c2. The communication passageway 24a is held in communication with the valve actuation chamber 23 through the valve port 22a (communication port) to have the oil introduction passageway portion 16b1 and the oil discharge passageway portion 18c2 held in communication with each other.

The second housing member 25 has a fixing screw coupling portion 25a secured to the first housing member 24 for example by a screw coupling (that may include other coupling methods other than the crew coupling), a flanged cylindrical portion 25b axially outwardly extending from the first housing member 24 at one end portion, and a valve sheet portion 25c received in the first housing member 24 at other end portion. The valve sheet portion 25c is formed with an annular passageway 26 between the first housing member 24 and the second housing member 25 to be held in communication with the oil introduction passageway portion 18c1. The valve sheet portion 25c is formed with another valve port 22b having the annular passageway 26 held in communication with the valve actuation chamber 23, and a plurality of communication through bores 25e radially extending and circumferentially equi-angularly arranged to have the valve port 22b held in communication with the annular passageway 26. The fixing screw coupling portion 25a of the second housing member 25 is not described in detail but constructed by a plurality of parts forming an inner annular circumferential groove 25g at the radially inward portion of the second housing member 25. The inner annular circumferential groove 25g may be formed after the groove 25g has a bimetal ring 51 received between the parts and then the parts are coupled with one another by pressing, screwing, welding and other fastening methods. The bimetal ring 51 will be described hereinafter.

The cylindrical portion 25b of the second housing member 25 has a center portion formed with an axial through bore having a center guide shaft 27 received therein. The center guide shaft 27 constitutes a movable shaft axially movably supported on the valve housing 21. The center guide shaft 27 has a large diameter sliding shaft portion 27a received in the axial through bore of the cylindrical portion 25b of the second housing member 25, a small diameter cylindrical guide shaft portion 27b projecting toward the valve actuation chamber 23 from the sliding shaft portion 27a, and a stopper portion 27c integrally formed with the sliding shaft portion 27a and engageable with the cylindrical portion 25b of the second housing member 25 to prevent the sliding shaft portion 27a from being outwardly moved out of the cylindrical portion 25b of the second housing member 25.

The sliding shaft portion 27a is provided with a plurality of seal rings 28 to hermetically seal an annular gap between the second housing member 25 and the sliding shaft portion 27a.

The guide shaft portion 27b is partly inserted into and coupled with the sliding shaft portion 27a by pressing the guide shaft portion 27b to the sliding shaft portion 27a or other fixing method. The outer peripheral surface of the guide shaft portion 27b has a high hardness and a smooth sliding surface finished and treated. The sliding shaft portion 27a is formed with an annular circumferential groove 27e (see FIG. 2) between the guide shaft portion 27b and the seal rings 28.

On the other hand, the valve actuation chamber 23 of the thermo-valve 20 is shown in FIGS. 1 to 3 as provided with a valve member 31, a flanged outer guide member 32 roughly in a cylindrical shape, and a conical coil spring 33 roughly in a conical shape.

The valve member 31 has a first valve body portion 41 for opening and closing the valve port 22, and a second valve body portion 42 for opening and closing the valve port 22b.

The first valve body portion 41 is movable to assume a first operation position AP1 shown in FIG. 2 and a second operation position AP2 shown in FIGS. 1 and 3. When the first valve body portion 41 is moved to the first operation position AP1, the valve port 22a is opened to have the oil introduction passageway portion 16b1 brought into communication with the oil discharge passageway portion 16b2 through the first flow passageway PW1. When, on the other hand, the first valve body portion 41 is moved to the second operation position AP2, the valve port 22a is closed to have the oil introduction passageway portion 16b1 brought out of communication with the oil discharge passageway portion 16b2 through the first flow passageway PW1. The second valve body portion 42 is movable to assume a first operation position BP1 shown in FIG. 2 in which the second valve body portion 42 closes the valve port 22b to have the oil introduction passageway portion 18c1 brought out of communication with the oil discharge passageway portion 16b2, and a second operation position BP2 shown in FIGS. 1 and 3 in which the second valve body portion 42 opens the valve port 22b to have the oil introduction passageway portion 18c1 brought into communication with the oil discharge passageway portion 16b2.

The outer guide member 32 has a flange portion 32f supported on a step portion 24d formed on the inner wall portion of the first housing member 24 partly forming the valve actuation chamber 23, and a guide portion 32g roughly in a cylindrical shape integrally formed with the flange portion 32f to axially slidably guide the valve member 31. The flange portion 32f is formed with a plurality of through bores 32h circumferentially equi-angularly arranged to form part of the first flow passageway PW1.

The valve member 31 has a slidable cylindrical portion 43 slidably engaged with the guide shaft portion 27b of the center guide shaft 27 and secured to the second valve body portion 42, a drum portion 45 integrally formed with the slidable cylindrical portion 43 and formed with a wax accommodating chamber 44 closed by the guide shaft portion 27b of the center guide shaft 27, and a valve guide shaft portion 46 projecting from the bottom wall portion of the drum portion 45 toward the valve port 22a in an opposite direction of the slidable cylindrical portion 43 to support the first valve body portion 41 in such a way having the first valve body portion 41 slidable in an axial direction of the center guide shaft 27. This means that the first valve body portion 41 is supported at its center portion on the drum portion 45 through the valve guide shaft portion 46 to be axially slidable with respect to the drum portion 45. Between the first valve body portion 41 and the drum portion 45 is provided a compression coil spring 47 serving as a first resilient member to impart an urging force in a direction closing the valve port 22a with the first valve body portion 41 between the first valve body portion 41 and the valve member 31.

On the other hand, the conical coil spring 33 is provided between the second valve body portion 42 and the valve housing 21 to serve as a second resilient member to impart an urging force in a direction closing the valve port 22b with the second valve body portion 42. Here, the second valve body portion 42 is integrally attached to the slidable cylindrical portion 43 and slidable together with the drum portion 45 and the slidable cylindrical portion 43. The urging force applied to the second valve body portion 42 from the conical coil spring 33 serves to be imparted to the second valve body portion 42 in a direction closing the valve port 22b with the second valve body portion 42.

The wax accommodating chamber 44 formed in the drum portion 45 of the valve member 31 and the slidable cylindrical portion 43 is filled with a filled material, such as for example a wax the same as that disclosed in the Patent Literature No. 1, expandable and contractible in response to the temperature of the oil in the valve actuation chamber 23. The wax accommodating chamber 44 therefore forms a variable volume chamber which can be expanded to increase the volume of the wax when the wax is expanded while being contracted to decrease the volume of the wax when the wax is contracted.

More specifically, the valve member 31 is constructed in such a manner that the slidable cylindrical portion 43 is slidably engaged with the guide shaft portion 27b of the center guide shaft 27 as explained in the above description. It will therefore be understood that the second valve body portion 42 can be moved in a direction having the second valve body portion 42 spaced apart from the valve sheet portion 25c against the urging force in a direction having the second valve body portion 42 close the valve sheet portion 25c in response to the wax expanded when the wax is expanded in the wax accommodating chamber 44 so that the valve port 22b can be opened. On the other hand, the second valve body portion 42 can be moved in a direction having the second valve body portion 42 moved toward the valve sheet portion 25c by the urging force in a direction having the second valve body portion 42 close the valve sheet portion 25c in response to the wax contracted when the wax is contracted in the wax accommodating chamber 44 so that the valve port 22b can be closed.

As will be understood from the foregoing description, the valve member 31 is displaceable in response to the temperature of the oil in the valve actuation chamber 23 and adapted to receive the urging force urging the valve member 31 toward the first operation position BP1 from the conical coil spring 33 in the valve actuation chamber 23. Therefore, the valve member 31 can assume the first operation position BP1 (see FIG. 2) in which the valve port 22b, the specific port selected from among the ports 21a to 21d and the ports 22a, 22b is closed when the temperature of the oil in the valve actuation chamber 23 is in the low pressure range preliminarily set, and the second operation position BP2 (see FIG. 3) in which the valve port 22b is opened when the temperature of the oil in the valve actuation chamber 23 is in the high pressure range preliminarily set.

The fact that the valve member 31 is adapted to receive the urging force urging the valve member 31 toward the first operation position BP1 from the conical coil spring 33 in the valve actuation chamber 23 through the second valve body portion 42, leads to the fact that the valve member 31 pressurizes the wax in the wax accommodating chamber 44 and is imparted a reaction force from the center guide shaft 27 through the wax.

The center guide shaft 27 axially movably provided on the valve housing 21 is constructed to move the valve member 31 to a valve movement limitation position GP1 having the valve member 31 retained at the second operation position BP2 as shown in FIG. 1 and to a valve movement allowance position GP2 having the valve member 31 replace in response to the temperature of the oil in the valve actuation chamber 23 as shown in FIGS. 2 and 3. The center guide shaft 27 is held urged by the conical coil spring 33 toward the first operation position BP1 through the wax in the wax accommodating chamber 44 and toward the valve movement allowance position GP2 in the usual using condition of the thermo-valve 20.

The center guide shaft 27 is held in engagement with the valve movement limitation position GP1 at the initial stage of the thermo-valve 20, viz., the stage from the finishing time of the thermo-valve 20 being assembled to the time when the thermo-valve 20 is connected to the automatic transmission 12 as part of an oil-hydraulic circuit and the valve actuation chamber 23 is filled with the oil. Between the center guide shaft 27 and the valve housing 21 is provided a bimetal ring 51 capable of being received in an inner annular groove 25g formed in the inner peripheral portion of the second housing member 25 and in an outer annular groove 27e formed in the outer peripheral portion of the center guide shaft 27 so that the center guide shaft 27 can be engaged with the valve housing 21 at the valve movement limitation position GP1 through the bimetal ring 51 received in the inner annular groove 25g of the second housing member 25 and the annular groove 27e of the center guide shaft 27 at the initial stage of the thermo-valve 20.

The bimetal ring 51 is constituted by a temperature sensitive deformation member roughly in a C-shape deformable in response to the temperature of the oil in the second housing member 25 which is equal to or close to the temperature (temperature measured at the position axially inward of the seal rings 28) the oil in the valve actuation chamber 23. The bimetal ring 51 is constructed to have two kinds of metal members 51a and 51b roughly in a C-shape and different in coefficient of thermal expansion (linear expansion coefficient) as shown in FIG. 4(a). The inner metal member 51a among the C-shaped metal members 51a and 51b is larger in linear expansion coefficient than the outer metal member 51b so that the inner diameter Dr of the bimetal ring 51 is near the diameter D1 of the bottom face of the outer annular groove 27e of the sliding shaft portion 27a as shown in FIG. 4(b) when the temperature around the bimetal ring 51 is in the low temperature range preliminarily set, while the inner diameter Dr of the bimetal ring 51 becomes larger than the outer diameter D2 of the sliding shaft portion 27a as shown in FIG. 4(c) when the temperature around the bimetal ring 51 is in the high temperature range preliminarily set. The principle and the manufacturing method of the bimetal are well known in the art and thus will not be described hereinafter.

The bimetal ring 51 is deformable to two different expanded shapes having the center guide shaft 27 retained to the valve movement limitation position GP1 as shown in FIG. 4(b) at the initial stage of the thermo-valve 20 until the temperature of the oil in the valve actuation chamber 23 firstly reaches the high temperature range and having the center guide shaft 27 released from the valve movement limitation position GP1 as shown in FIG. 4(c) when the temperature of the oil in the valve actuation chamber 23 firstly reaches the high temperature range. At this time of the temperature of the oil in the valve actuation chamber 23 firstly reaches the high temperature range, the outer peripheral portion of the bimetal ring 51 deformed to the expanded shape is engaged with the bottom portion of the inner annular groove 25g as shown in FIG. 4(c) so that the bimetal ring 51 can function to have the center guide shaft 27 coaxially positioned with respect to the valve housing 21, viz., positioned at the center of the valve housing 21. This means that the bimetal ring 51 surrounds part of the sliding shaft portion 27a and is held in engagement with the outer annular groove 27e of the sliding shaft portion 27a at the initial stage of the thermo-valve 20, however, the bimetal ring 51 is expanded in diameter to be released from the part of the sliding shaft portion 27a when the temperature of the oil in the valve actuation chamber 23 firstly reaches the high temperature range. Additionally, when the temperature of the oil in the valve actuation chamber 23 firstly reaches the high temperature range to have the bimetal ring 51 deformed to the expanded shape having the center guide shaft 27 released from the valve movement limitation position GP1 between the center guide shaft 27 and the valve housing 21, the bimetal ring 51 is engaged with one of the center guide shaft 27 and the valve housing 21 to be retained at the most preferable radial specified position required to be released with respect to the center guide shaft 27

The operation will hereinafter be described.

The thermo-valve 20 of the present embodiment constructed as described above is shown in FIG. 1 to have an initial stage until the oil is introduced into the valve actuation chamber 23. The initial stage includes a stage at which the thermo-valve 20 is delivered to a vehicle-assembling factory as one of vehicle parts after being finished in its assembling operation, and a stage at which the thermo-valve 20 is assembled with the vehicle drive system 10, and a stage at which the valve actuation chamber 23 is filled with the oil. At the above initial stage, the center guide shaft 27 is retained to the valve movement limitation position GP1 by the bimetal ring 51 so that the valve member 31 is retained to the second operation position BP2. Therefore, the valve port 22b specified irrespectively of the temperature of the oil in the valve actuation chamber 23 is held in the open state.

The thermo-valve 20 held in the valve movement limitation state with the center guide shaft 27 being retained to the valve movement limitation position GP1 by the bimetal ring 51 is then assembled with the vehicle drive system 10 for example in the vehicle-assembling factory. Immediately after the assembling operation of the thermo-valve, the oil is not filled into the first heat exchanger 15, the thermo-valve 20, the second heat exchanger 18, and the oil pipes 18a, 18b each serving as a cooler tube.

The timing of the oil being filled into the valve actuation chamber 23 is before or after the operation of the automatic transmission 12 after the thermo-valve 20 is assembled with the vehicle drive system 10. At this time, the temperature of the oil in the valve actuation chamber 23 is held in the low temperature state in which the temperature of the oil in the valve actuation chamber 23 does not reach the high temperature range preliminarily set, but the valve port 22b specified irrespectively of the temperature of the oil in the valve actuation chamber 23 is held in the open state.

Therefore, the oil can be filled without fail, under the low temperature operation environment, viz., in the state having the temperature of the oil being out of the high temperature range, into the circuit of the second heat exchanger 18 which could allow the oil to flow therethrough when the temperature of the oil in the valve actuation chamber 23 reaches the high temperature range preliminarily set if the ordinary valve operation is carried out.

When the thermo-valve 20 is finished in being assembled with the vehicle drive system 10, and the temperature of the oil in the valve actuation chamber 23 firstly reaches the high temperature range, the bimetal ring 51 is expanded in diameter and thus has the center guide shaft 27 positioned at a radially specified position, viz., at the center of the valve housing 21 with the outer peripheral portion of the bimetal ring 51 before the wax in the valve member 31 is expanded to has the valve member 31 compress the conical coil spring 33. The bimetal ring 51 is therefore released from the outer annular groove 27e of the center guide shaft 27 so that the center guide shaft 27 can be released from the retained state thereof by the bimetal ring 51. At this time, the valve member 31 receiving the urging force toward the first operation position BP1 is moved to close the valve port 22b, and the center guide shaft 27 allowing the valve member 31 to displace is moved to the valve movement allowance position GP2.

At this time, the center guide shaft 27 released from the valve movement limitation position GP1 in response to the varied temperature of the oil in the valve actuation chamber 23 leads to the fact that unnecessary operations for the center guide shaft 27 to be released from the valve movement limitation position GP1 cannot be completely required. The thermo-valve 20 according to the present invention needs no operation required in the conventional apparatus to have the bimetal ring 51 project outwardly of the valve housing 21, resulting from the manual operation to release the center guide shaft 27. The fact that the unnecessary operations for the center guide shaft 27 to be released from the valve movement limitation position GP1 cannot be completely required, makes it possible for the oil to be easily filled without fail into the circuit of the second heat exchanger 18 having the oil flow therethrough even under the low temperature operation environment, viz., in the state having the temperature of the oil being out of the high temperature range.

Here, the following operation as seen in the conventional thermo-valve is assumed and considered for comparison with the above advantage of the thermo-valve 20 according to the present invention. Even if the oil is tried to be filled into the circuit of the second heat exchanger 18 when the oil in the valve actuation chamber 23 only by the operation of the thermo-valve 20, the oil cannot be filled into the circuit of the second heat exchanger 18 when the temperature of the oil in the valve actuation chamber 23 is in the low temperature range so that the operation to check whether the oil is leaked or not cannot be carried out at the stage of the temperature of the oil in the low temperature range. The reason is such that the valve port 22b held in communication with the second heat exchanger 18 and the oil pipes 18a, 18b remains to be closed even with the first heat exchanger 15 filled with the oil. During the time period in which the temperature of the oil in the valve actuation chamber 23 does not reach the high temperature range in the performance test after completing the assembling operation, all the performance test cannot be completed. There may not only cause times deviated to fill the oil into the valve actuation chamber 23 but deteriorate the operability of filling the oil into the valve actuation chamber 23.

In contrast, the present embodiment is simple in construction with the bimetal ring 51 made of a temperature sensitive deformation member being received in and engaged with the outer annular groove 27e of the center guide shaft 27 to be expandable in response to the temperature of the oil in the valve actuation chamber 23 so that the center guide shaft 27 can be retained without fail to the valve movement limitation position GP1 until the temperature of the oil in the valve actuation chamber 23 reaches the high temperature range. Therefore, the oil can be filled into the circuits allowing the oil to flow therethrough at the times of the low and high temperature ranges. When the temperature of the oil in the valve actuation chamber 23 reaches the high temperature range, the bimetal ring 51 made of the temperature sensitive deformation member is released from the center guide shaft 27 so that the center guide shaft 27 can be released from being retained as described above.

In the present embodiment, the valve member 31 assumes the first operation position BP1 in which the first flow passageway PW1 is established to have the first inlet port 21a brought into communication with the first outlet port 21b, and the second operation position BP2 in which the second flow passageway PW2 to have the second inlet port 21c brought into the first outlet port 21b through the specified port in the valve housing 21 so that the first flow passageway PW1 and the second operation position BP2 can be selectively changed without fail in response to the temperature of the oil introduced into the valve actuation chamber 23.

In the present embodiment, the ports 21a to 21d and the ports 22a, 22b include the valve port 22a constituting the communication port forming part of the first flow passageway PW1, and the valve member 31 has the first valve body portion 41 for opening and closing the valve port 22a, and the second valve body portion 42 for opening and closing the valve port 22b. In addition, the first valve body portion 41 assumes the first operation position AP1 having the valve port 22a opened to allow the first inlet port 21a and the first outlet port 21b to be brought into communication with each other through the first flow passageway PW1, and assumes the second operation position AP2 having the valve port 22a closed to allow the first inlet port 21a and the first outlet port 21b to be brought out of communication with each other through the first flow passageway PW1, while the second valve body portion 42 assumes the first operation position BP1 having the valve port 22b closed to allow the second inlet port 21c and the first outlet port 21b to be brought out of each other, and assumes the second operation position BP2 having the valve port 22b opened to allow the second inlet port 21c and the first outlet port 21b to be brought into communication with each other. Accordingly, the valve member 31 assumes the first operation position BP1 having the valve port 22a opened and having the valve port 22b closed, while assuming the second operation position BP2 having the valve port 22a closed and having the valve port 22b opened. The thermo-valve 20 according to the present invention is thus simple in construction only with the valve member 31 being straightly moved and enables the first flow passageway PW1 and the second flow passageway PW2 to be selectively and smoothly changed without fail in response to the temperature of the oil introduced into the valve actuation chamber 23

As has been described in detail, the valve member 31 has a slidable cylindrical portion 43 slidably engaged with the guide shaft portion 27b of the center guide shaft 27 and secured to the second valve body portion 42, and a drum portion 45 integrally formed with the slidable cylindrical portion 43 and formed with a wax accommodating chamber 44 closed by the guide shaft portion 27b of the center guide shaft 27. The first valve body portion 41 is supported on the drum portion 45 to be displaceable in the axial direction of the center guide shaft 27, while the compression coil spring 47 is provided on the first valve body portion 41 to urge the first valve body portion 41 toward the valve port 22a to close the valve port 22a. The previously mentioned construction makes it possible to preferably retain the closed state having the valve port 22a closed with the first valve body portion 41 even if the volume of the wax in the wax accommodating chamber 44 of the drum portion 45 varies in the state having the center guide shaft 27 retained to the valve movement limitation position GP1.

Additionally, the thermo-valve 20 according to the present embodiment comprises the conical coil spring 33 disposed between the second valve body portion 42 and the valve housing 21 to urge the second valve body portion 42 toward the valve port 22b to close the valve port 22b so that the center guide shaft 27 can be imparted the urging force of the conical coil spring 33 through the valve member 31 to be immediately restored to the valve movement allowance position GP2 when the bimetal ring 51 is released from the center guide shaft 27 to release the center guide shaft 27 from being retained.

In the thermo-valve 20 according to the present embodiment, the wax accommodating chamber 44 variable in volume is filled with the wax expandable and contractible in response to the temperature of the oil in the valve actuation chamber 23 so that when the temperature of the oil in the valve actuation chamber 23 is increased, the wax in the drum portion 45 is expanded, the valve member 31 allows the drum portion 45 to displace with respect to the center guide shaft 27 so that the valve port 22b can be opened by the valve member 31. The valve port 22b opened by the valve member 31 when the temperature of the oil in the valve actuation chamber 23 is increased, makes it possible to have the oil introduced into other circuits using a high temperature oil and adjusting the temperature of the oil, for example, a cooling circuit represented by the second heat exchanger 18.

The bimetal ring 51 is deformed between the center guide shaft 27 and the cylindrical portion 25b of the second housing member 25 of the valve housing 21 into the shave having the center guide shaft 27 released from the valve movement limitation position GP1 when the temperature of the oil in the valve actuation chamber 23 firstly reaches the high temperature range. At this time, the bimetal ring 51 is engaged with the cylindrical portion 25b of the second housing member 25 of the valve housing 21 and retained to the specific position most suitable to release the center guide shaft 27, so that the bimetal ring 51 can be positioned without fail at a set position, thereby making it possible to carry out the releasing operation of the guide shaft 27 without fail when the bimetal ring 51 is deformed into the shape having the guide shaft 27 released from the valve movement limitation position GP1.

As has been described in the above, according to the present embodiment, at the initial stage until the oil is introduced into the valve actuation chamber 23, the center guide shaft 27 is retained to the valve movement limitation position GP1 by the bimetal ring 51, and the valve port 22b is opened irrespectively of the temperature of the oil in the valve actuation chamber 23 so that the oil can be filled without fail to the second heat exchanger 18 allowing the fluid such as the oil at the time of the temperature of the oil being in the high temperature range even under the low temperature operation environment. Further, when the temperature of the oil in the valve actuation chamber 23 reaches the high temperature range after the oil filling operation, the bimetal ring 51 is released from the center guide shaft 27 to have the center guide shaft 27 released from being retained, the valve member 31 being moved in a direction having the valve port 22b closed, and the center guide shaft 27 being returned to the valve movement allowance position GP2, so that there can be no need for the unnecessary operations to be performed to release the center guide shaft 27 from the valve movement limitation position GP1, or otherwise no need for any operation tool to be manipulated outside of the valve housing 21 to complete the above mentioned releasing operation. As a result, the present invention can provide a thermo-valve 20 which can perform easily and without fail the operation to fill the oil in the circuit having the fluid flow at the time of the temperature of the oil in the valve actuation chamber 23 being in the high temperature range without performing any unnecessary releasing operation needed in the conventional thermo-valve.

Although the thermo-valve 20 according to the present embodiment as described above uses a bimetal ring 51 accommodated in the valve housing 21 is roughly in a C-shape to be engaged with the outer annular groove 27e of the center guide shaft 27 at the initial stage, the shape of the bimetal ring 51 is limited to the C-shape but may be formed in any shape if the bimetal ring 51 can be released from the center guide shaft 27 when the temperature of the oil passing through the oil passageway 16b firstly reaches the high temperature range. Further, the bimetal ring 51 does not need to be made of a bimetal ring as described above.

The bimetal ring 51 may be replaced by an engagement ring made for example of a shape-memory alloy if the engagement ring can allow the center guide shaft 27 to be released from being retained to the valve movement limitation position GP1 and to be returned to the valve movement allowance position GP2 when the temperature of the oil in the valve actuation chamber 23 reaches the high temperature range. The bimetal ring 51 may be of any shape other than the ring-shape like C-shape such as an arc shape, a rod shape, a plate shape, and a non-circular annular shape, which can be partly moved toward and away from the center guide shaft 27 in response to the ambient temperature varied. More specifically, the bimetal ring 51 may be replaced by a pair of engagement members each made for example of a bimetal or a shape-memory alloy, respectively in the concave shape and concavity shape opposite to each other, and engageable with the outer annular groove 27e of the center guide shaft 27.

The temperature sensitive deformation member may be replaced by an engagement member of a combined type having a member deformable by being sensitive to the temperature and a member not deformable by being sensitive to the temperature. The deformation direction of the temperature sensitive deformation member at the time of the center guide shaft 27 being released from the valve movement limitation position GP1 is not limited to the radial expansion direction as described above, but may preferably be the radial contraction direction, viz., the direction having the bimetal ring 51 retracted in the center guide shaft 27 with the outer peripheral surface of the bimetal ring 51 being radially inward of the outer surface of the center guide shaft 27. Therefore, the temperature sensitive deformation member may be engaged with the valve housing and retained to the specific position suitable to release the center guide shaft 27. Further, the temperature sensitive deformation member may be engaged with the valve position limitation member like the center guide shaft 27 and retained to the specific position. Here, the specific position suitable to release the center guide shaft 27 is intended to indicate a specific position in the radial direction of the center guide shaft 27. In other word, the specific position is intended to mean a specific position in the direction perpendicular to the radial direction of the valve, viz., perpendicular to the axial direction of the valve operation. According to the present invention, the specific position is not limited to the above position specified in the radial direction of the valve position limitation member like the center guide shaft 27.

In addition, the temperature sensitive deformation member may not be constructed as above to be received in the outer annular groove 27e of the center guide shaft 27 like the bimetal ring 51, but may be constructed to have any shape to be engaged with a step, an annular concave or convex, non-annular concaves (holes) formed on the valve position limitation member constituting the movable shaft for example like the center guide shaft to have the center guide shaft 27 regulated to axially move in the direction having the center guide shaft 27 released from the valve housing 21.

Another Embodiment

Figure 6:
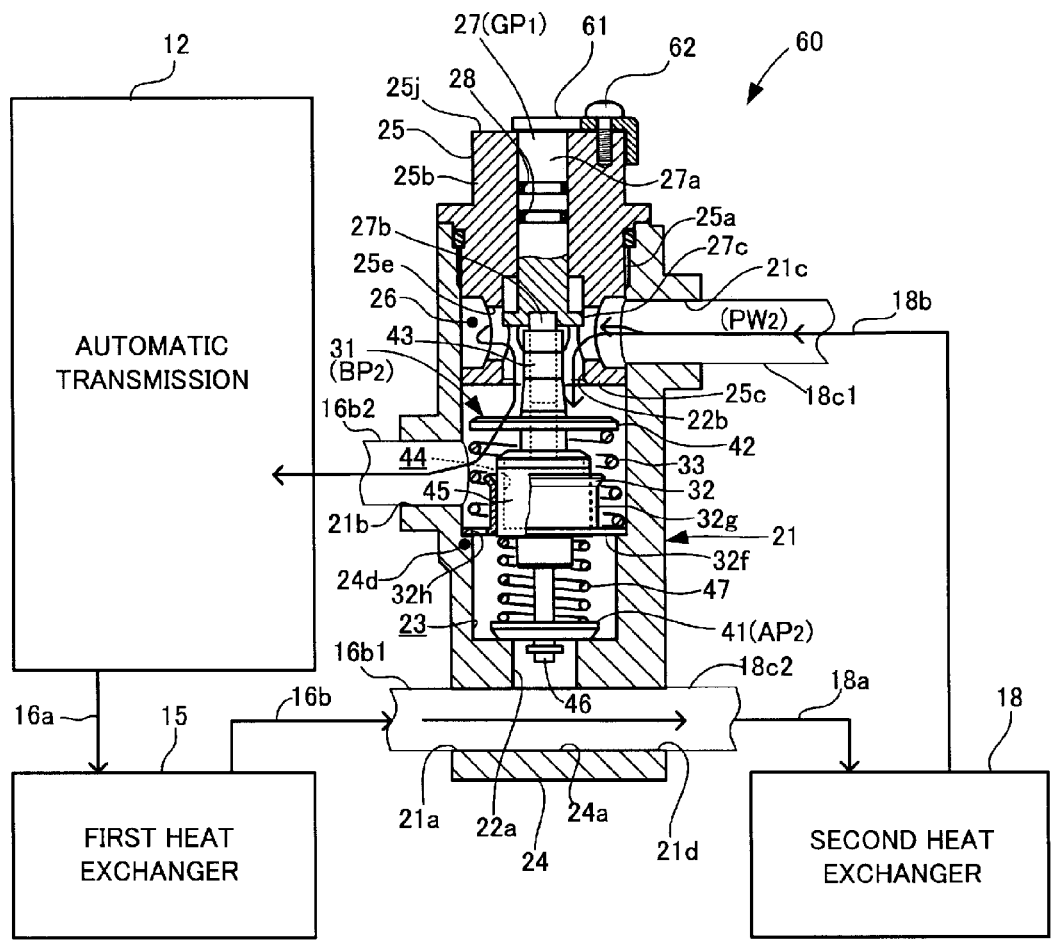
FIG. 6 is a block construction view of the essential part of the vehicle drive system maintained at the initial stage and equipped with a thermo-valve according to another embodiment of the present invention, only the thermo-valve being shown in cross-section
Figure 7:
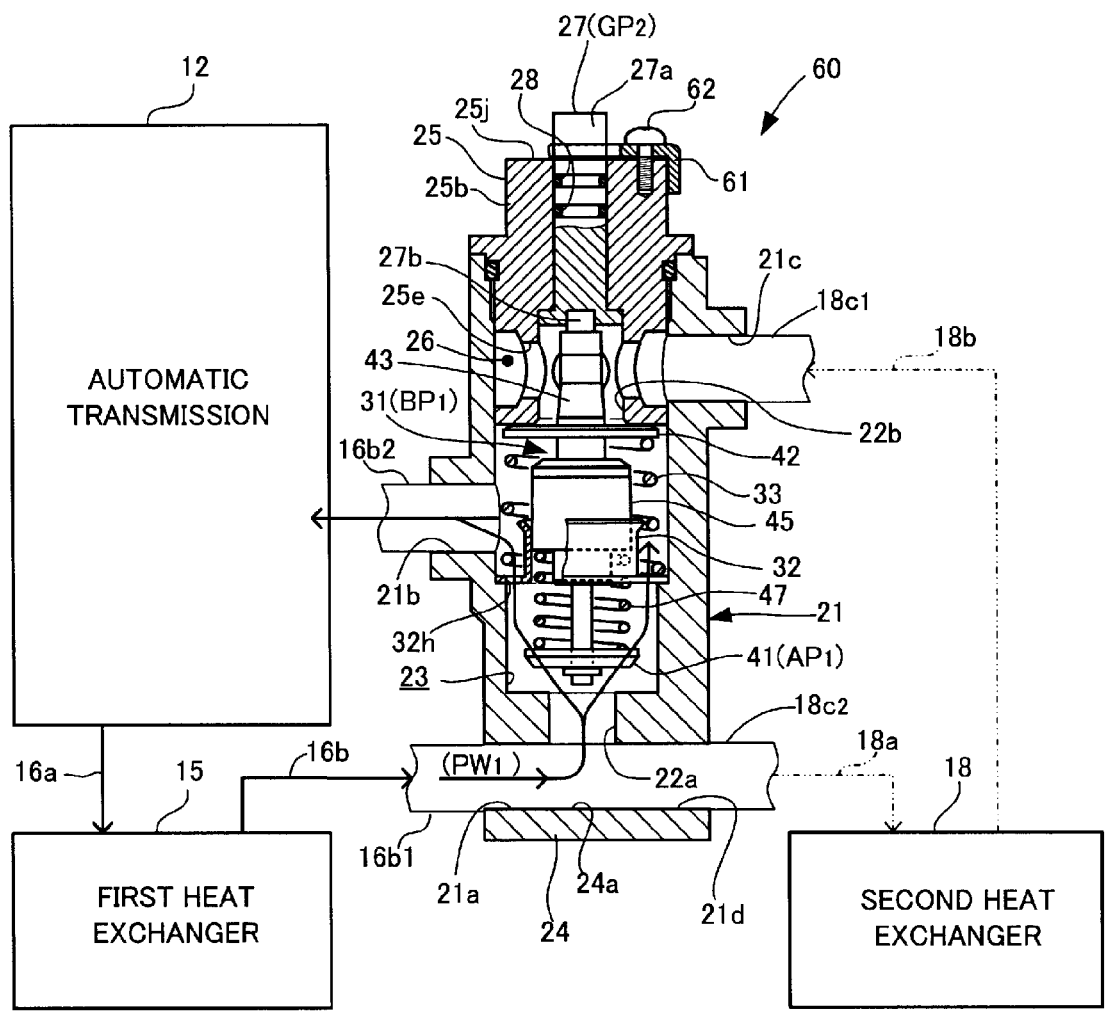
FIG. 7 is a block construction view of the essential part of the vehicle drive system maintained at the time when oil is at a low temperature after the initial stage and equipped with the thermo-valve according to another embodiment of the present invention, only the thermo-valve being shown in cross-section.

FIGS. 6 and 7 show another embodiment of the thermo-valve according to the present invention. The thermo-valve and the vehicle drive system of the present embodiment are almost the same in construction as those of the previously mentioned thermo-valve and the vehicle drive system of the previously mentioned embodiment except for the temperature sensitive deformation member and its peripheral construction, so that the constitution elements of the present embodiment same as and similar to those of the previously mentioned embodiment bears the same reference numerals as those of the previously mentioned embodiment in FIGS. 1 to 5 and will hereinafter be described in simplicity while the different points from the previously mentioned embodiment will hereinafter be described in detail.

As shown in FIGS. 6 and 7, the thermo-valve 60 according to the present embodiment comprises a valve housing 21, a valve member 31, and a center guide shaft 27 constituting a movable shaft and a valve movement limitation member. The valve housing 21 is not formed with the inner annular groove 25g (see FIG. 3), while the center guide shaft 27 is not formed with the outer annular groove 27e in the thermo-valve 60 according to the present embodiment different from the thermo-valve 20 according to the previously mentioned embodiment.

As shown in FIG. 6, the length of the sliding shaft portion 27a of the center guide shaft 27 and the length of the second housing member 25 of the valve housing 21 are set to have the outer end face of the sliding shaft portion 27a of the center guide shaft 27 is roughly flush with the end face 25j of the second housing member 25 of the valve housing 21 when the center guide shaft 27 assumes the valve movement limitation position GP1 in which the valve member 31 is retained to the second operation position BP2.

Figure 8:
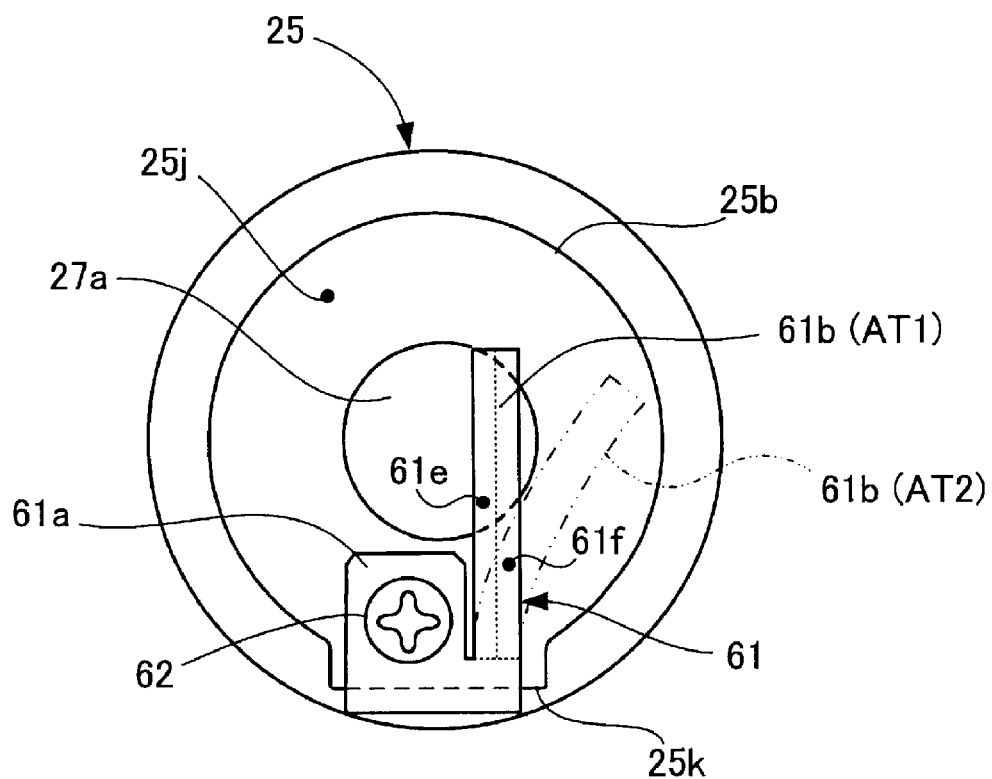
FIG. 8 is a plan view of the thermo-valve having a temperature sensitive deformation member shown in the state in which the temperature sensitive deformation member is assembled in the thermo-valve according to another embodiment of the present invention.

As shown in FIGS. 6 to 8, on the end face 25j of the second housing member 25 outside of the valve housing 21 is mounted a temperature sensitive deformation member 61 in the attachment posture preliminarily set. The temperature sensitive deformation member 61 is retained in face-to-face contact with both of the valve housing 21 and the center guide shaft 27 at the initial stage in which the temperature sensitive deformation member 61 is attached to the valve housing 21 and the center guide shaft 27 and at a stage in which the temperature of the temperature sensitive deformation member 61 is below the preliminarily set temperature. The temperature sensitive deformation member 61 is disposed between the valve housing 21 and the center guide shaft 27 and secured to the valve housing 21 at the initial stage in such a manner that the heat is conducted to the temperature sensitive deformation member 61 from the center guide shaft 27.

The temperature sensitive deformation member 61 is deformable to a shape in which the center guide shaft 27 is retained to the valve movement limitation position GP1 at the initial stage until the temperature of the oil in the valve housing 21 firstly reaches the high temperature range in response to at least one of, for example both of the temperatures of the valve housing 21 and the center guide shaft 27 and in which the center guide shaft 27 is released from the valve movement limitation position GP1 when the temperature of the oil in the valve housing 21 firstly reaches the high temperature range.

More specifically, the temperature sensitive deformation member 61 comprises a fixing portion 61a secured to the end face 25j of the second housing member 25 of the valve housing 21 by a fixing screw 62, and a deformation portion 61b extending toward the sliding shaft portion 27a of the center guide shaft 27 from the fixing portion 61a and deformable to a shape in which the center guide shaft 27 is released from the valve movement limitation position GP1 when the temperature of the oil in the valve housing 21 is over the preliminarily set temperature.

The deformation portion 61b of the temperature sensitive deformation member 61 is constituted by a bimetal plate for example in a rod shape and extending in the radial direction of the center guide shaft 27 from the fixing portion 61a, and thus constructed to have two metal members 61e, 61f respectively in slender plate shapes, different in linear expansion coefficient, and jointed together. The metal member 61e near the center axis of the center guide shaft 27 is larger in linear expansion coefficient than the metal member 61f. The deformation portion 61b of the temperature sensitive deformation member 61 assumes an initial posture AT1 or a posture near the initial posture AT1 shown in solid lines in FIG. 8 when the temperature of the deformation portion 61b is in the low temperature range preliminarily set, and a releasing posture AT2 shown in phantom lines in FIG. 8 or curved near the releasing posture when the temperature of the deformation portion 61b reaches the high temperature range preliminarily set.

Therefore, the temperature sensitive deformation member 61 can assume a posture as shown in solid lines in FIG. 8, viz., an initial posture AT1 in which the temperature sensitive deformation member 61 is held in engagement with the center guide shaft 27 to have the center guide shaft 27 retained to the valve movement limitation position GP1 at the initial stage of the thermo-valve 60 until the thermo-valve 60 is connected to the automatic transmission 12 as part of an oil pressure circuit and the valve actuation chamber 23 is filled with the oil from the finishing time of the thermo-valve being assembled with the vehicle drive system 10. The temperature sensitive deformation member 61 can then be deformed in the radial direction of the center guide shaft 27 to be moved from the initial posture AT1 to the releasing posture AT2 shown in phantom lines in FIG. 8 or curved in a direction having the temperature sensitive deformation member 61 released from the center guide shaft 27 in response to the raised temperatures of the valve housing 21 and the center guide shaft 27 when the temperature of the oil in the valve actuation chamber 23 firstly reaches the high temperature range preliminarily set after the finishing time of the thermo-valve 60 being assembled with the vehicle drive system 10.

The temperature sensitive deformation member 61 has a rotation stop portion 61c bent substantially perpendicularly to the fixing portion 61a. The second housing member 25 of the valve housing 21 has a flat side face 25k formed on the side surface thereof. The rotation stop portion 61c is held in engagement with the flat side face 25k of the second housing member 25 of the valve housing 21 so that the temperature sensitive deformation member 61 can be prevented from being rotated together with the fixing screw 62 when the temperature sensitive deformation member 61 is coupled with the second housing member 25 of the valve housing 21 by the fixing screw 62. The rotation stop portion 61c of the temperature sensitive deformation member 61 is not necessarily required according to the present invention. In lieu of the previously mentioned rotation stop portion 61c of the temperature sensitive deformation member 61, the end face 25j of the second housing member 25 of the valve housing 21 may be formed with a guide portion or a positioning portion in a protrusion shape or a concavity shape held in engagement with the part of the fixing portion 61a of the temperature sensitive deformation member 61 to have the temperature sensitive deformation member 61 directed and positioned with respect to the second housing member 25 of the valve housing 21, so that the temperature sensitive deformation member 61 can be prevented from being rotated together with the fixing screw 62 when the temperature sensitive deformation member 61 is coupled with the second housing member 25 of the valve housing 21 by the fixing screw 62.

The deformation portion 61b of the temperature sensitive deformation member 61 in the thermo-valve 60 according to the present embodiment as described above can assume the initial posture AT1 as shown in solid lines in FIG. 8 at the stage having the oil introduced into the valve actuation chamber 23. Therefore, the center guide shaft 27 is retained to the valve movement limitation position GP1, and the valve member 31 is retained to the second operation position BP2 by the temperature sensitive deformation member 61, while the valve port 22b is opened, viz., held in the opened state.

The fact that the valve port 22b is held in the opened state even if the temperature of the oil in the valve actuation chamber 23 does not reach the high temperature preliminarily set when the oil is filled into the valve actuation chamber 23 after the thermo-valve 60 is assembled in the automatic transmission 12, leads to the fact that the oil can be filled into the circuit of the second heat exchanger 18 having the oil flow therethrough in the usual valve operation of the thermo-valve 60 when the temperature of the oil reaches the high temperature range preliminarily set under the low temperature operation environment in which the temperature of the oil is not in the high temperature range.

When the temperature of the oil in the valve actuation chamber 23 firstly reaches the high temperature range preliminarily set after the automatic transmission 12 is assembled in the vehicle drive system 10, at least one of the valve housing 21 and the center guide shaft 27 held in contact with the oil in the valve actuation chamber 23 is varied in temperature in response to the temperature of the oil, so that the heat of the valve housing 21 and the center guide shaft 27 can be conducted to the temperature sensitive deformation member 61. At this time, the temperature sensitive deformation member 61 is deformed in the radial direction of the center guide shaft 27 to be moved from the initial posture AT1 to the releasing posture, the releasing posture AT2 in phantom lines shown in FIG. 8 and curved in a direction having the temperature sensitive deformation member 61 released from the center guide shaft 27 in response to the raised temperatures of the valve housing 21 and the center guide shaft 27.

The center guide shaft 27 is thus released from the valve movement limitation position GP1 by the temperature sensitive deformation member 61, and the valve member 31 is returned to close the valve port 22b by the urging force of the conical coil spring 33 toward the first operation position BP1. Simultaneously, the center guide shaft 27 is returned to the valve movement allowance position GP2.

As will be understood from the foregoing description, the present embodiment in simple construction only with the temperature sensitive deformation member 61 being held in engagement with and thus retained by the center guide shaft 27 constituting the movable shaft, results in the fact that the center guide shaft 27 is retained without fail to the valve movement limitation position GP1 until the temperature of the fluid in the valve actuation chamber 23 reaches the high temperature range, while the center guide shaft 27 is released without fail from the valve movement limitation position GP1 in response to the varied temperature of the fluid in the valve actuation chamber 23 when the temperature of the fluid in the valve actuation chamber 23 reaches the high temperature range As a result, the present embodiment thus constructed not only does not need any work for releasing the center guide shaft 27 from the valve movement limitation position GP1 but also the oil can be filled easily and without fail into the circuit of the second heat exchanger 18 having the oil flow therethrough in the high temperature range under the working temperature environment in which temperature of the oil does not reach the high temperature range.

In addition, the temperature sensitive deformation member 61 can be watched from the outside of the valve housing 21, thereby making it possible to visually determine whether or not the center guide shaft 27 is retained to the valve movement limitation position GP1 by the temperature sensitive deformation member 61. Even if the temperature sensitive deformation member 61 does not normally work by some reason, the center guide shaft 27 can be released from the valve movement limitation position GP1 by removing the fixing screw 62 from the second housing member 25 of the valve housing 21. This means that the present embodiment thus constructed comes to have a failsafe function.

Further in the present embodiment, the deformation portion 61b of the temperature sensitive deformation member 61 is made of a bimetal plate extending in the radial direction of the center guide shaft 27, so that the free end of the deformation portion 61b of the temperature sensitive deformation member 61 can be deformed to a large extent in the radial direction of the center guide shaft 27, and the deformation portion 61b can easily be arranged in contact with the flat side face 25k of the second housing member 25 of the valve housing 21. As a consequence, the center guide shaft 27 can be retained to and released from the valve movement limitation position GP1 without fail without having the temperature sensitive deformation member 61 project to a large extent outside of the valve housing 21. As the temperature sensitive deformation member 61 has a fixing portion 61a to be secured to the second housing member 25 of the valve housing 21, the heat can be conducted effectively to the temperature sensitive deformation member 61 from the valve housing 21 and the center guide shaft 27, thereby making the temperature sensitive deformation member 61 to reliably work with respect to the center guide shaft 27 and the valve housing 21. The heat can be conducted to the temperature sensitive deformation member 61 not only from one of the center guide shaft 27 and the valve housing 21 but from both of the center guide shaft 27 and the valve housing 21, thereby resulting in an excellent heat responsibility.

Although the description for the above present embodiment has been directed to the valve member 31 being of a wax accommodating type, any type of the valve member 31 may be used in place of the wax accommodating type. For example, one of the types of the valve member 31 may be constructed to expand and contract the fluid in the valve actuation chamber 23 in response to the temperature of the fluid to close and open the valve port 22b. The above embodiment has been explained about the thermovalves 20 and 60 arranged vertically as shown in FIGS. 1 to 3, and FIGS. 6 and 7, however, the thermo-valves 20 and 60 may of course have respective postures arranged horizontally and in any other directions.

Though the above present embodiment has been explained about the fact that the center guide shaft 27 is retained to the valve movement limitation position GP1 at the initial stage until the oil is introduced into the valve actuation chamber 23, and the valve member 31 assumes the second operation position BP2, the center guide shaft 27 can be retained again to the valve movement limitation position GP1 if the center guide shaft 27 is manually pushed toward the inside of the valve housing 21 from the exterior before the oil is filled again into the valve actuation chamber 23 for example for exchanging the oil. From the foregoing description, it will be understood that the fluid can be filled easily and without fail into the circuit of the heat exchanger having the fluid flow therethrough at the time of the fluid being at the high temperature with no unnecessary work not only at the stage of the assembling the thermo-valve but also at the time of the oil being exchanged.

As has been explained in the above, the thermo-valve according to the present invention is constructed to have the valve position limitation member retained to the valve movement limitation position to open the specific port irrespectively of the temperature of the fluid in the valve actuation chamber with the temperature sensitive deformation valve at the initial stage having the fluid introduced into the valve actuation chamber so that the fluid can be filled without fail into the circuit having the fluid flow therethrough at the time of the high temperature range under the low temperature working environment, and the temperature sensitive deformation member can be released from the valve position limitation member to have the valve movement limitation member released from the valve movement limitation position and to have the valve member returned to the valve closing position without any special releasing operation when the temperature of the fluid in the valve actuation chamber after the oil is filled into the circuit, leads to the fact that the thermo-valve can be operated with no unnecessary work to fill the fluid easily and without fail into the circuit having the fluid flow therethrough at the time of the high temperature range. The present invention is useful for all of the thermo-valves suitable for the circuit having the heat exchanger capable of adjusting the temperature of the oil used for lubricating and cooling the vehicular transmission.

REFERENCE SIGNS LIST

12: automatic transmission
15: first heat exchanger
16b1, 18c1: oil introduction passageway portion
16b2, 18c2: oil discharge passageway portion
18: second heat exchanger
20, 60: thermo-valve
21: valve housing
21a: outer connection port (first inlet port)
21b: outer connection port (first outlet port)
21c: outer connection port (second inlet port)
21d: outer connection port (second outlet port)
22a: one valve port (communication port)
22b: other valve port (specific port)
23: valve actuation chamber
24: first housing member
25: second housing member
25g: inner annular groove
25j: end face
27: center guide shaft (valve position limitation member)
27a: sliding shaft portion
27b: guide shaft portion
27e: outer annular groove
31: valve member
32: outer guide member
32h: through bore
33: conical coil spring (second resilient member)
41: first valve body portion
42: second valve body portion
43: slidable cylindrical portion
44: wax accommodating chamber (volume variable chamber)
45: drum portion
46: valve guide shaft
47: compression coil spring (first resilient member)
51: bimetal ring (temperature sensitive deformation member)
61: temperature sensitive deformation member
61a: fixing portion
61b: deformation portion
62: fixing screw
AP1, BP1: first operation position
AP2, BP2: second operation position
AT1: initial posture
AT2: releasing posture
GP1: valve operation limitation position
GP2: valve operation allowance position
PW1: first fluid passageway
PW2: second fluid passageway

The invention claimed is:

1. A thermo-valve, comprising:
a valve housing formed with a plurality of ports respectively held in communication with the exterior passageways, and an valve actuation chamber held in communication with the ports;
a valve member displaceable in the valve actuation chamber in response to the temperature of fluid in the valve actuation chamber to assume a first operation position to close a specific port selected from among the ports when the temperature of the fluid in the valve actuation chamber is maintained within a predetermined low temperature range, and a second operation position to open the specific port when the temperature of the fluid in the valve actuation chamber is maintained within a predetermined high temperature range, the valve member receiving an urging force toward the first operation position in the valve actuation chamber; and
a valve position limitation member accommodated in the valve housing and movable to assume a valve movement limitation position in which the valve member is retained to the second operation position and a valve movement allowance position in which the valve member is allowed to displace in response to the temperature of the fluid, the valve position limitation member being urged toward the valve movement allowance position; characterized in that the thermo-valve further comprises:
a temperature sensitive deformation member disposed between the valve position limitation member and the valve housing and deformable in response to the temperature,
the temperature sensitive deformation member being deformed into a shape to retain the valve position limitation member to the valve movement limitation position at an initial stage until the temperature of the fluid in the valve housing initially reaches the high temperature range and to release the valve position limitation member from the valve movement limitation position when the temperature of the fluid in the valve housing initially reaches the high temperature range.

2. The thermo-valve as set forth in claim 1, in which the temperature sensitive deformation member is accommodated in the valve housing and deformable in response to the temperature within the valve housing.

3. The thermo-valve as set forth in claim 1, in which the temperature sensitive deformation member is provided outside of the valve housing and deformable in response to the temperature of at least one of the valve housing and the valve position limitation member.

4. The thermo-valve as set forth in claim 1, in which the valve position limitation member is constituted by a movable shaft axially movably supported on the valve housing.

5. The thermo-valve as set forth in claim 4, in which the temperature sensitive deformation member is radially deformed from its initial posture at which the temperature sensitive deformation member is engaged with the movable shaft to have the movable shaft retained to the valve movement limitation position when the temperature sensitive deformation member is deformed to have the movable shaft released from the valve movement limitation position.

6. The thermo-valve as set forth in claim 5, in which the temperature sensitive deformation member is constituted by a bimetal ring surrounding part of the movable shaft and expandable in diameter to be spaced apart from the part of the movable shaft when the temperature of the fluid reaches the high temperature range.

7. The thermo-valve as set forth in claim 4, in which the temperature sensitive deformation member has a fixing portion secured to the valve housing, and a deformation portion connected to the fixing portion and deformable to the shape having the movable shaft released from the valve movement limitation position.

8. The thermo-valve as set forth in claim 7, in which the deformation portion of the temperature sensitive deformation member is constituted by a bimetal ring extending in the radial direction of the movable shaft from the fixing portion.

9. The thermo-valve as set forth in claim 1, in which the plurality of ports comprises, other than the specific port, a first inlet port for introducing the fluid into the inside of the valve housing, a first outlet port for discharging the fluid from the inside of the valve housing, a second outlet port held in communication with the first inlet port, and a second inlet port for introducing the fluid discharged from the second outlet port,
  a first fluid passageway being formed in the valve housing to have the first inlet port and the first outlet port held in communication with each other when the valve member assumes the first operation position, and
  a second fluid passageway being formed in the valve housing to have the second inlet port and the first outlet port held in communication with each other through the specific port when the valve member assumes the second operation position.

10. The thermo-valve as set forth in claim 9, in which the plurality of ports includes a communication port constituting part of the first fluid passageway, and the valve member has a first valve body portion for opening and closing the communication port and a second valve body portion for opening and closing the specific port,
  the first valve body portion assuming the first operation position in which the communication port is opened to have the first inlet port and the first outlet port held in communication with each other through the first fluid passageway, and the second operation position in which the communication port is closed to have the first inlet port and the first outlet port held out of communication with each other through the first fluid passageway, and
  the second valve body portion assuming the first operation position in which the specific port is closed to have the second inlet port and the first outlet port held out communication with each other, and the second operation position in which the specific port is opened to have the second inlet port and the first outlet port held in communication with each other.

11. The thermo-valve as set forth in claim 10, in which the valve member has a slidable cylindrical portion axially slidably engaged with the valve position limitation member, a drum portion integrally formed with the slidable cylindrical portion to form a volume variable chamber closed by the valve position limitation member,
  the first valve body portion axially displaceably supported on the drum portion, and the first valve body portion and the valve member allowing a first resilient member to intervene therebetween to impart to the first valve body an urging force in the direction having the communication port closed.

12. The thermo-valve as set forth in claim 10, in which the second valve body portion and the valve housing allows a second resilient member to intervene therebetween to impart to the second valve body an urging force in the direction having the specific port closed.

13. The thermo-valve as set forth in claim 1, in which the temperature sensitive deformation member is retained at a specific position of either one of the valve position limitation member and the valve housing when the temperature sensitive deformation member is deformed between the valve position limitation member and the valve housing to the shape having the valve position limitation member released from the valve movement limitation position in response to the temperature of the fluid first reaching the high temperature range.

* * * * *